April 21, 1931.   W. RATZER   1,801,613
MOLDING PRESS
Filed Aug. 29, 1928
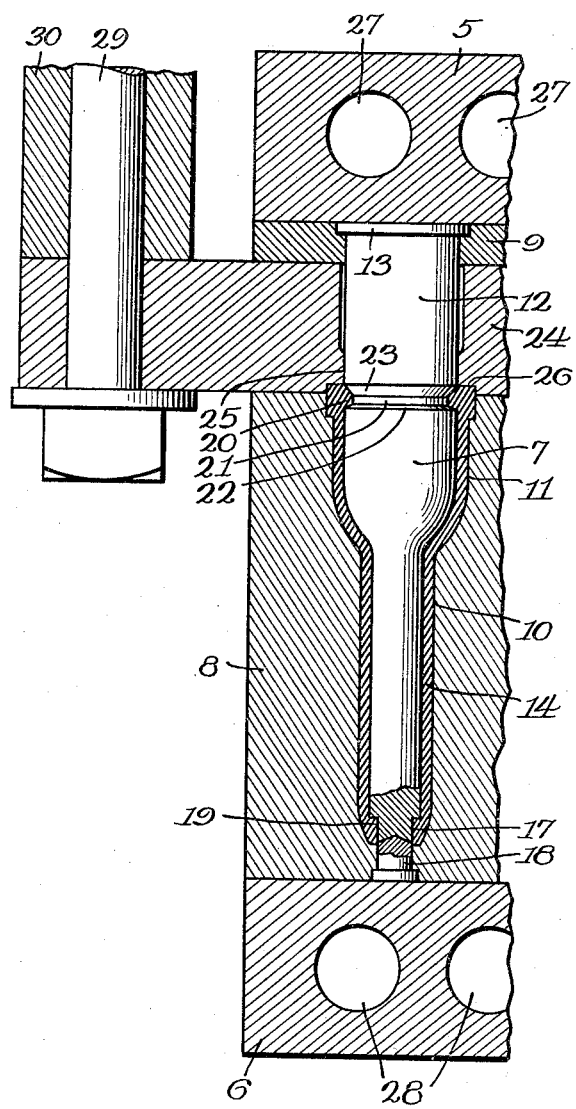
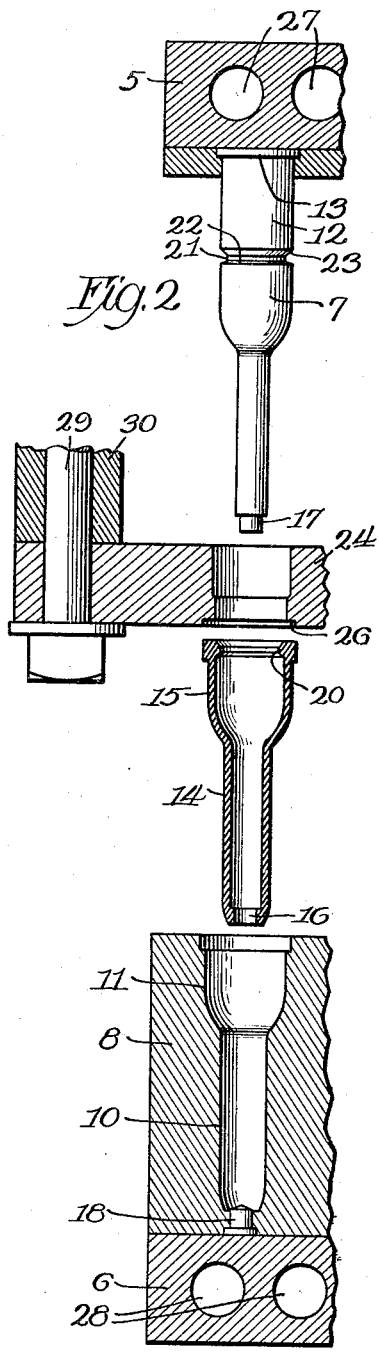
Inventor:
William Ratzer
By Fisher, Clapp, Soans & Pond
Attys.

Patented Apr. 21, 1931

1,801,613

UNITED STATES PATENT OFFICE

WILLIAM RATZER, OF OAK PARK, ILLINOIS, ASSIGNOR TO BELDEN MANUFACTURING COMPANY, OF CHICAGO, ILLINOIS, A CORPORATION OF ILLINOIS

MOLDING PRESS

Application filed August 29, 1928. Serial No. 302,670.

This invention relates to molding presses, and more particularly to a molding press intended for the molding of hollow or tubular articles of more or less flexible material. The objects of the invention are: to provide, in a molding press, means for removing or drawing the molded article out of the female die; to provide such means which will be effective to free the articles from both the male and the female die members without in any way injuring the articles; to provide such means which will be simple in construction and efficient in operation so as to speed up production of the articles; to provide a press adapted to mold articles from a mass of uncured or partly cured material, and operative to cure the material as an incident to the molding operation; and, in general, it is the object of this invention to provide an improved molding press of the class described.

Other objects and advantages of the invention will be understood by reference to the following specification and the accompanying drawing wherein I have shown certain parts of a molding press embodying one form of my invention.

In the drawing:

Fig. 1 is a sectional view taken through the axis of the male and female die members, the male die member being shown in elevation and in cooperative position relative to the female die member, and Fig. 2 is a view similar to Fig. 1, but showing the dies in parted position and one of the molded articles in section.

Referring now to the drawings, I have indicated an upper platen or head member 5 and a lower platen or head member 6, which platens or head members are mounted in a molding press in a manner well known to those skilled in the art so that one of the head members is movable towards and away from the other. A male die member 7 is carried by the upper head member and is adapted to cooperate with a female die member 8 which is carried by the lower head 6. The female die member may be secured to the lower head in any suitable manner, and the male die member may be secured to the upper head 5 in any suitable manner, preferably by means of a holding plate 9.

The female die member in the present instance is provided with a recess or mold cavity 10 which is substantially cylindrical in form and provided with an enlarged upper end portion 11. The male die member conforms substantially to the shape of the mold cavity 10 and is provided with a shank 12 at its upper end which is provided with a flange 13 at its upper end, the latter being provided for facilitating locking of the male die in place on the upper head 5 by means of the holding plate 9.

As shown in Fig. 1, the male and female die members are in cooperative position wherein they form a tubular mold cavity adapted to the molding of a portable or so-called trouble lamp casing 14. This casing is formed of any suitable flexible and resilient material, preferably rubber, which may be of such composition that it will be tough and capable of withstanding the sort of handling to which lamps such as trouble lamps are often subjected. The upper enlarged portion 15 of the casing is adapted to receive an electric socket of suitable construction, and the lower, straight, tubular end portion serves as a handle for the lamp and has a conduit for a part of the electric wires which enter the socket, thereby protecting the conductors adjacent the socket. The lower end of the casing is provided with an aperture 16 through which the conductor wires may pass, and this aperture is provided in the casing by means of a reduced end portion 17 on the male die member and a pin portion 18 constituting a part of the female die member, the said end portion 17 being provided with a conical-shaped recess 19 adapted to receive a similarly shaped end provided on the pin 18, whereby the lower end of the male die is accurately centered in the mold cavity.

Adjacent the outer or enlarged end of the casing 14, I provide an inwardly-extending annular flange 20 which is adapted to retain the socket in the said enlarged end of the casing. For forming the inwardly-projecting flange 20, the male die member is provided with an annular recess 21, which is defined at its lower end by means of an inclined shoulder 22 which extends downwardly and outwardly from the bottom of the recess 21. The upper end of the recess is defined by another shoulder 23 which is inclined upwardly and outwardly from the bottom of said recess.

By thus shaping the male die member, that is, by providing the male die member with the above-described recess formation, it will be understood that the molded article will be provided with an inwardly-extending flange which in effect interlocks the molded article and the male die member. When the male die member is withdrawn from the female die member, i. e., when the dies are parted, it will be apparent that the molded article 14 will be drawn out of the mold cavity 10 by the die member through the agency of the said interlocking connection.

For stripping the molded article from the male die member when the dies are parted, I provide a stripper plate 24 which is provided with an aperture 25 slidably fitting over the shank portion 12 of the male die member and the enlarged portion of the die proper immediately below the said shank portion. The stripper 24 is provided with an annular recess 26 adjacent the lower end of the aperture 25, the said recess 26 constituting a part of the mold cavity, as clearly shown in Fig. 1. It will be observed that the stripper also constitutes a closure for the upper end of the mold cavity.

In making the rubber trouble lamp casing above described, a predetermined quantity of uncured or partly cured rubber is supplied to the mold cavity 10. The male die member is of course effective to cause the uncured mass to spread into the tubular cavity which is formed when the male member is moved into operative position in the female die member. In order to cure the uncured or partly cured material, I provide the upper and lower heads 5 and 6 with a plurality of passage-ways 27 and 28, respectively, through which steam or any other heating agent is adapted to be circulated to heat the said heads and incidentally the respective die members. The dies are, of course, heated sufficiently to effect practically complete curing of the rubber, so that when the article is drawn out of the female die member and stripped from the male die member, a completed article is produced.

The head members 5 and 6 are moved relative to one another by means of any suitable mechanism, which, as above stated, is well known to those skilled in the art and hence need not be herein shown or described. The lower die member preferably is stationary and the upper head is movable. The stripper member 24 is connected in any suitable manner—in the present instance, by means of a tie rod 29 and spacing sleeve 30—to any suitable mechanism for effecting movement of the stripper, partly in unison with the male die member and partly independently thereof.

In practice, the movements imparted to the male die member and stripper may be such that, after the article is completely molded in the cavity formed by the male and female dies and stripper member when in the closed cooperating position shown in Fig. 1, the male die and stripper move upwardly in unison, whereby the molded article is withdrawn from the female die member. At any predetermined point in the upward movement of the male die member and stripper, the stripper member may be stopped, that is, held stationary, or moved downwardly relative to the male die member so as to strip the article therefrom. The stripping action is of course effected through the engagement of the stripper member at the bottom of the recess 26 with the top end of the article, the inclined shoulder 22 of the male die member facilitating expansion or stretching of the upper end of the article so that the same will pass over the enlarged part of the male die. Such expansion or stretching of the upper end of the article is, of course, permitted because of the inherent quality of the material from which the article is made.

I am aware that my above described invention is applicable to the manufacture of articles besides the above-described trouble lamp casing, and that the construction and arrangement of the parts constituting my improved molding press may be changed without departing from the spirit of my invention, the scope of which should be determined by reference to the following claims, the same being construed as broadly as possible consistent with the state of the art.

I claim as my invention:

1. In a molding machine of the class described, the combination of relatively movable upper and lower head members, a female die member secured to one of said head members, and a male die member secured to the other of said head members, said male die member being provided with a portion shaped so as to cause the molded article to interlock therewith, whereby the molded article is drawn out of said female die when said dies are separated.

2. In a molding machine of the class described, the combination of relatively movable upper and lower head members, a female die member secured to one of said head members, a male die member secured to the other of said head members, said male die member being provided with a portion shaped so as to cause the molded article to interlock therewith, whereby the molded article is drawn out of said female die when said dies are separated, and means for stripping the molded member from said male die.

3. In a molding press for molding hollow articles of rubber or other flexible material, the combination of a pair of relatively movable upper and lower head members, male and female die members respectively secured to said upper and lower head members, said die members being adapted to cooperate to form a mold cavity for molding said articles, said male die member being provided with a formation effecting interlocking engagement with the molded article whereby said male die member is operative to draw the article out of said female die member when said dies are parted, a stripper associated with said male die member adapted to remain stationary relative thereto during an initial portion of the parting movement between said die members and thereafter to move relative to said male die to strip the molded article therefrom, the article so interengaging with said male die member as to be disengageable therefrom only by expansion of said article.

4. In a molding press for molding hollow articles of rubber or other flexible material, the combination of a pair of relatively movable upper and lower head members, male and female die members respectively secured to said upper and lower head members, said die members being adapted to cooperate to form a mold cavity for molding said articles, said male die member being provided with a recess defined at its lower edge by an inclined shoulder extending downwardly and outwardly from the bottom of said recess, said recess serving to form an inwardly projecting part on the molded article whereby said male die member and article are interlocked and whereby said male die member is operative to draw the article out of said female die when said dies are parted, a stripper associated with said male die member adapted to remain stationary relative thereto during an initial portion of the parting movement between said die members and thereafter to move relative to said male die to strip the molded article therefrom, the flexibility of the article permitting said interlocking parts to be disengaged by said stripper.

5. In a molding press of the class described for molding tubular flexible articles, the combination of pair of relatively movable upper and lower head members, male and female die members respectively secured to said head members, said female die member being closed at its lower end and open at its upper end for receiving said male die member, the latter being positioned substantially coaxial with said female die and forming therewith a tubular mold cavity, the upper end of which is open, said male die member being provided with a recessed portion defined at its lower end by a laterally outwardly projecting shoulder, said recess serving to form an inwardly projecting part on the molded article whereby the article and male die member are interlocked so that the latter is operative to draw the article out of said female die when said die members are parted, a stripper associated with said male die member and serving to close the upper end of said mold cavity when said die members are in cooperative position, said stripper being adapted to remain stationary relative to said male die member during an initial part of the parting movement between said die members, and thereafter to be moved relative to said male die member to strip the molded article therefrom, the flexibility of the molded article serving to permit said interlocking parts to be disengaged.

6. In a molding press for molding hollow articles of rubber or other flexible material, the combination of a pair of relatively movable upper and lower head members provided with steam passages adapted to permit steam to be circulated therethrough for heating said heads, male and female die members respectively secured to said upper and lower head members, said die members being adapted to cooperate to form a mold cavity for molding said articles, the mold cavity being adapted to receive a charge of semi-cured material adapted to be cured by the heat of said dies incident to the heat of said head members, said male die member being provided with a formation effecting interlocking engagement with the molded article whereby said male die member is operative to draw the article out of said female die member when said dies are parted, a stripper associated with said male die member adapted to remain stationary relative thereto during an initial portion of the parting movement between said die members and thereafter to move relative to said male die to strip the molded article therefrom, the flexibility of the article permitting said interlocking parts to be disengaged by said stripper.

7. In a device of the class described, a pair of cooperating relatively movable die members comprising a female die and a male die, said male die having an annular irregularity therein for interlocking with the molded article, and a stripper member for disengaging said article from said male die, the stripping operation being possible only by reason of the resilience of the article.

8. In a device of the class described, a pair of cooperating relatively movable die members comprising a female die and a male die, said male die having an annular depression therein for interlocking with the molded article, and a stripper member for disengaging said article from said male die, the stripping operation being possible only by reason of the resilience of the article.

WILLIAM RATZER.